Patented Sept. 22, 1931

1,824,220

UNITED STATES PATENT OFFICE

ALBERT B. MACKEY, OF CLEVELAND HEIGHTS, AND EDWIN A. MACKEY, OF CLEVELAND, OHIO, ASSIGNORS TO THE GOLIATH RUBBER COMPANY, OF CLEVELAND, OHIO, A CORPORATION OF OHIO

COMPOSITION OF MATTER ADAPTED FOR THE FABRICATION OF BATTERY BOXES AND OTHER MATERIAL

No Drawing.   Application filed November 19, 1926. Serial No. 149,524.

This application is a continuation in part of our application filed on or about June 1, 1926, Serial No. 113,100.

Our invention relates to a composition of matter suitable for use in the construction of battery boxes or the like.

A battery box should be able to resist destruction by the electrolyte used, (generally sulpuric acid), should be electrically insulating, should not soften materially at temperatures ranging between 130° F. and 150° F., and should be able to withstand repeated jarring without cracking or breaking.

It is the object of this invention to provide a composition of matter which will meet these conditions for use in the manufacture of battery boxes and other articles and from which the latter may be constructed at less cost than heretofore.

Said object is effected by selecting and combining, in the manner hereinafter pointed out, a number of ingredients, as will now be set forth in detail.

The essential ingredients of our composition are, a bituminous binder, a fibrous material, and a wax; but to these it is found preferable to add other ingredients, as indicated below. The composition which we have found best suited for the purposes indicated is composed of the following ingredients in substantially the following proportions:

|  | Parts by weight |
|---|---|
| Ground tire carcass | 15 |
| Used tire fabric derubberized and ground | 7½ |
| Wax | 7½ |
| Carbon black | 1½ |
| Siliceous material | 30 |
| Blown asphalt compound | 22½ |
| Gilsonite | 16 |

Fibrous material is an essential ingredient of our composition and is employed to give necessary strength to the product, and it may be furnished from many sources and in a variety of forms. Cotton fibre has been found to work successfully, and as a convenient source we have utilized used tire carcasses which consist chiefly of fibrous material impregnated with about 50% of vulcanized rubber, and which may be obtained at low cost. Methods of recovering the rubber content of such tires are now practiced and therefore ground cotton fabric free from rubber may readily be procured from such used tires and is now obtainable in the market as a by-product of such methods. The first two ingredients of the preferred formula, as given above, supply this fibrous content, and the first—ground tire carcass—also supplies a proportion of vulcanized rubber which adds a desirable quality to our product, particularly when used for battery boxes. The 22½ parts included in the first two ingredients of our preferred formula might be composed of ground tire carcass alone, but in such case the vulcanized rubber content would exceed the quantity necessary to give to the product the desirable quality conferred by this material, and the strengthening quality conferred by the fibre would be correspondingly reduced. We therefore prefer to supply the fibrous content in part from fibre not impregnated with vulcanized rubber, such as used tire fabric derubberized and ground. A useful product may be made without the use of rubber. As above stated, many fibrous materials may be used. For example, asbestos fibre, especially asbestos which is free from material such as iron, which may be attacked by the acid, may be employed as such other fabric, with good results. To effectively perform its function in our composition, the fibrous material need not be reduced to a finely divided condition but may be, and preferably is, used in a coarse condition in the form of sort threads or groups of threads. For grinding tire carcasses to the desired condition we have employed Bambury machines or rubber crackers, afterwards running the material through a rubber mill, but any other machinery suitable for this purpose may be used as will be apparent to those skilled in the art.

Wax is a necessary ingredient of this composition, the principal function of which appears to be to permit the molded material to be readily and quickly removed from the mold, since in its absence there is a decided tendency of the article to stick to the sides of the mold. Wax of various kinds may be employed, but it has been found preferable to use a wax of comparatively high melting point. The wax which we have found to give the best results is Montan wax,—well-known bituminous wax which may be easily obtained. The well-known vegetable wax known as carnauba wax, which has a melting point slightly higher than Montan wax, is also well adapted for use in our composition, and other waxes might be employed.

Carbon black is used to give the desired color to the product, and obviously may be omitted.

Siliceous material is used as a filler. As it is desirable that a battery box be as light as possible, consistent with other necessary characteristics, we prefer to use siliceous material of low specific gravity. A material which we have found to give very successful results is now known in the market as "Kallite", which is a finely divided and fluffy material containing about 90% silica, and which we understand consists of the lighter particles of ground sand or rock having a high silica content which have been separated from the heavier particles by a process known in the art as "air-floating".

It is obvious that other fillers may be employed, or it might be omitted altogether, the essential ingredients, as above indicated, being then employed in greater proportion.

The preferred formula includes a blown asphalt compound and gilsonite, which are used chiefly for binding purposes and to give heat-resisting character to the product. Blown asphalt is a manufactured product, made from residuum petroleum oils. It is made in different grades, differing in specific characteristics. For our purpose it is desirable to select a blown asphalt having a high melting point, say, of approximately 300° F., of high insulating qualities, tough, and capable of being softened to a condition of plasticity sufficient to make it workable in a mold without application of a temperature such as will cause the fibrous content of the composition to oxidize, when oxidizable fibre is used, such as cotton fibre. A blown asphalt having the desired characteristics is now in the market and is known as "Paradura", analysis of the two grades of which, as follows, defines its characteristics in terms of tests that have been standardized for bituminous material:

|  | Grade #204 | Grade #202 |
|---|---|---|
| Melting point—cube in air method | 300° F. | 320° F. |
| Penetration @ 77° F. (100 grams—5 sec.) | 3 | 1 |
| Penetration @ 122° F. (100 grams—5 sec.) | 8–9 | 5–8 |
| Penetration @ 168° F. (100 grams—1 min.) | 68 | 45–60 |
| Solubility in carbon disulfide | 99.65% | Same |
| Solubility in carbon tetrachloride | 99.61% | Same |
| Insoluble in benzol | .272% | Same |
| Acetone extract | 57.80% | Same |
| Fixed carbon | 22.63% | Same |
| Ash | 0.438% | Same |
| Sulphur | 1.952% | Same |

Gilsonite and blown asphalt of the character indicated are both bituminous material and have many characteristics in common, but the blown asphalt is more acid-resisting. Blown asphalt may be used alone as a binder and gilsonite entirely omitted, but it is preferable to use a proportion of the latter on account of its lower cost.

The ingredients in substantially the proportions set forth are placed in any suitable receptacle and thoroughly mixed, commingled or agitated for a period of substantially one hundred and five minutes while subjected to a temperature substantially of 300° F. This operation is purely one of mixing the ingredients without substantially disturbing the physical structure of the fibrous material. After the mixture has been agitated for the requisite length of time, the mass is removed from the receptacle and passed through the standard type of machine for the purpose of rolling the same into a sheet of suitable thickness for convenient subsequent manipulation.

The above-described material is of a character such that it is readily amenable to a "cold-pressing" operation for the manufacture of battery boxes, which is, as is well known, simple and inexpensive as compared with the vulcanizing process which is used in the manufacture of so-called "rubber boxes".

The "cold-pressing" operation merely consists in providing a mold having a cavity conforming with the exterior contour of the desired box, and a suitable plunger conforming to the interior thereof, introducing the requisite amount of material into the cavity, and then introducing the plunger into the mold, such material having first, however, been rendered sufficiently plastic by the application of heat thereto, to permit it to flow readily into and fill the space between the mold and the plunger, all as will be readily understood by those skilled in the art.

After the plunger is so introduced, it is allowed to remain until the material has cooled somewhat, such cooling being usually facilitated by the use of water jackets around the mold and in the plunger. This cooling usually requires only about three minutes.

The plunger is then removed, and the molded box removed. Such removal is greatly facilitated by the presence of the wax in the composition. The wax also imparts a desirable lustre and smooth finish to the surfaces of the box, which greatly enhances its appearance and is hence highly desirable.

In the above-described manner we provide a composition particularly suitable for the fabrication of battery boxes, which meets all requirements, and from which they can be produced at a lower cost than has heretofore been possible.

It will be obvious, however, that our composition may be used for the fabrication of any other articles to which it is desired to impart any or all of the characteristics above described.

What we claim is:

1. A composition of matter consisting of the following ingredients in substantially the proportions by weight as follows: ground tire carcass, 15 parts; used tire fabric derubberized and ground, 7½ parts; wax, 7½ parts; carbon black, 1½ parts; siliceous material, 30 parts; blown asphalt, 22½ parts; and gilsonite, 16 parts.

2. A composition of matter including ground tire carcass of substantially twenty-three percent, wax of substantially eight percent, bituminous material of substantially thirty-nine percent, and a filler of substantially thirty percent.

3. A composition of matter including ground tire carcass of substantially twenty-three percent, wax of substantially eight percent, siliceous material of substantially thirty percent, and blown asphalt and gilsonite of substantially thirty-nine percent.

4. A composition of matter including fibrous material impregnated with vulcanized rubber, said material and rubber comprising substantially twenty-three percent of the composition, bituminous material substantially thirty-nine percent, wax of substantially eight percent, and a filler substantially thirty percent.

5. A battery box made of compressed material including fibrous material impregnated with vulcanized rubber, said material and rubber comprising substantially twenty-three percent, blown asphalt comprising substantially thirty-nine percent, siliceous filler of low specific gravity of substantially thirty percent, and wax substantially eight percent.

Signed by us this 17th day of November, 1926.

ALBERT B. MACKEY.
EDWIN A. MACKEY.